(12) United States Patent
Wang

(10) Patent No.: US 7,336,483 B2
(45) Date of Patent: Feb. 26, 2008

(54) EXTERNAL CASING FOR A DATA STORAGE DEVICE

(75) Inventor: Chia-Jen Wang, Taipei Hsien (TW)

(73) Assignee: Datastor Technology Co., Ltd., Taipei Hsien (TW)

( * ) Notice: Subject to any disclaimer, the term of this patent is extended or adjusted under 35 U.S.C. 154(b) by 93 days.

(21) Appl. No.: 11/413,374

(22) Filed: Apr. 27, 2006

(65) Prior Publication Data

US 2007/0195498 A1    Aug. 23, 2007

(30) Foreign Application Priority Data

Feb. 20, 2006    (TW) .............................. 95202845 U

(51) Int. Cl.
  *G06F 1/16*    (2006.01)
(52) U.S. Cl. ...................... 361/685; 713/193; 345/169; 360/97.02
(58) Field of Classification Search ................ 713/189, 713/193; 345/169, 168; 360/60, 97.02; 62/259.2; 361/679–687, 724–727
  See application file for complete search history.

(56) References Cited

U.S. PATENT DOCUMENTS 6,297,949 B1 * 10/2001 Nayak et al. ............... 361/684

2005/0013110 A1* 1/2005 Shah et al. .................. 361/685
2006/0181845 A1* 8/2006 Shah et al. .................. 361/685
2007/0086156 A1* 4/2007 Skinner ....................... 361/685
2007/0098281 A1* 5/2007 Fujie et al. .................. 382/239

* cited by examiner

*Primary Examiner*—Hung Van Duong
(74) *Attorney, Agent, or Firm*—Christensen O'Connor Johnson Kindness PLLC

(57) ABSTRACT

An external casing includes a housing housed with a data storage device and formed with an opening. An interface module is disposed in the housing, and is connected electrically to the data storage device disposed in the housing. An external electrical connector is connected electrically to the interface module. A foldable cover member includes a fixing portion secured to a first housing part of the housing, an engaging portion opposite to the fixing portion, and an intermediate covering portion interconnecting the fixing portion and the engaging portion and covering over the external electrical connector. A lock unit is provided on a second housing part of the housing and the engaging portion of the cover member for selectively anchoring the engaging portion of the cover member to the second housing part of the housing.

17 Claims, 3 Drawing Sheets

EXTERNAL CASING FOR A DATA STORAGE DEVICE

CROSS-REFERENCE TO RELATED APPLICATION

This application claims priority of Taiwanese Application No. 095202845, filed on Feb. 20, 2006.

BACKGROUND OF THE INVENTION

1. Field of the Invention

The invention relates to an external casing for a data storage device, more particularly to an external casing for a data storage device that has a lock unit to anchor selectively a cover member to a housing.

2. Description of the Related Art

A conventional external casing for a portable data storage device, such as a hard disk, includes a housing for receiving the data storage device therein, an interface module disposed in the housing and connected electrically to the data storage device disposed in the housing, and an external electrical connector connected electrically to the interface module and disposed in the vicinity of an opening in the housing. A foldable cover member is fastened to the housing, and covers over the external electrical connector. The cover member is provided with an engaging ring engaging releasably an engaging protrusion on the housing, thereby protecting the external electrical connector from dust when the external electrical connector is not in use.

However, the aforesaid conventional external casing cannot prevent data stored in the data storage device from unauthorized data access. Therefore, it is desired to design an external casing for a data storage device capable of ensuring security of data stored in the data storage device.

SUMMARY OF THE INVENTION

Therefore, the object of the present invention is to provide an external casing for a data storage device that can ensure security of data stored in the data storage device.

According to the present invention, there is provided an external casing for a data storage device. The external casing comprises:

a housing configured with an accommodating space adapted for receiving the data storage device therein and formed with an opening for access into the accommodating space, the housing having opposite first and second housing parts;

an interface module disposed in the accommodating space and adapted to be connected electrically to the data storage device that is disposed in the accommodating space in the housing;

an external electrical connector connected electrically to the interface module and disposed in the vicinity of the opening in the housing;

a foldable cover member including a fixing portion secured to the first housing part of the housing, an engaging portion opposite to the fixing portion, and an intermediate covering portion interconnecting the fixing portion and the engaging portion and covering over the external electrical connector; and a lock unit provided on the second housing part of the housing and the engaging portion of the cover member for selectively anchoring the engaging portion of the cover member to the second housing part of the housing.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
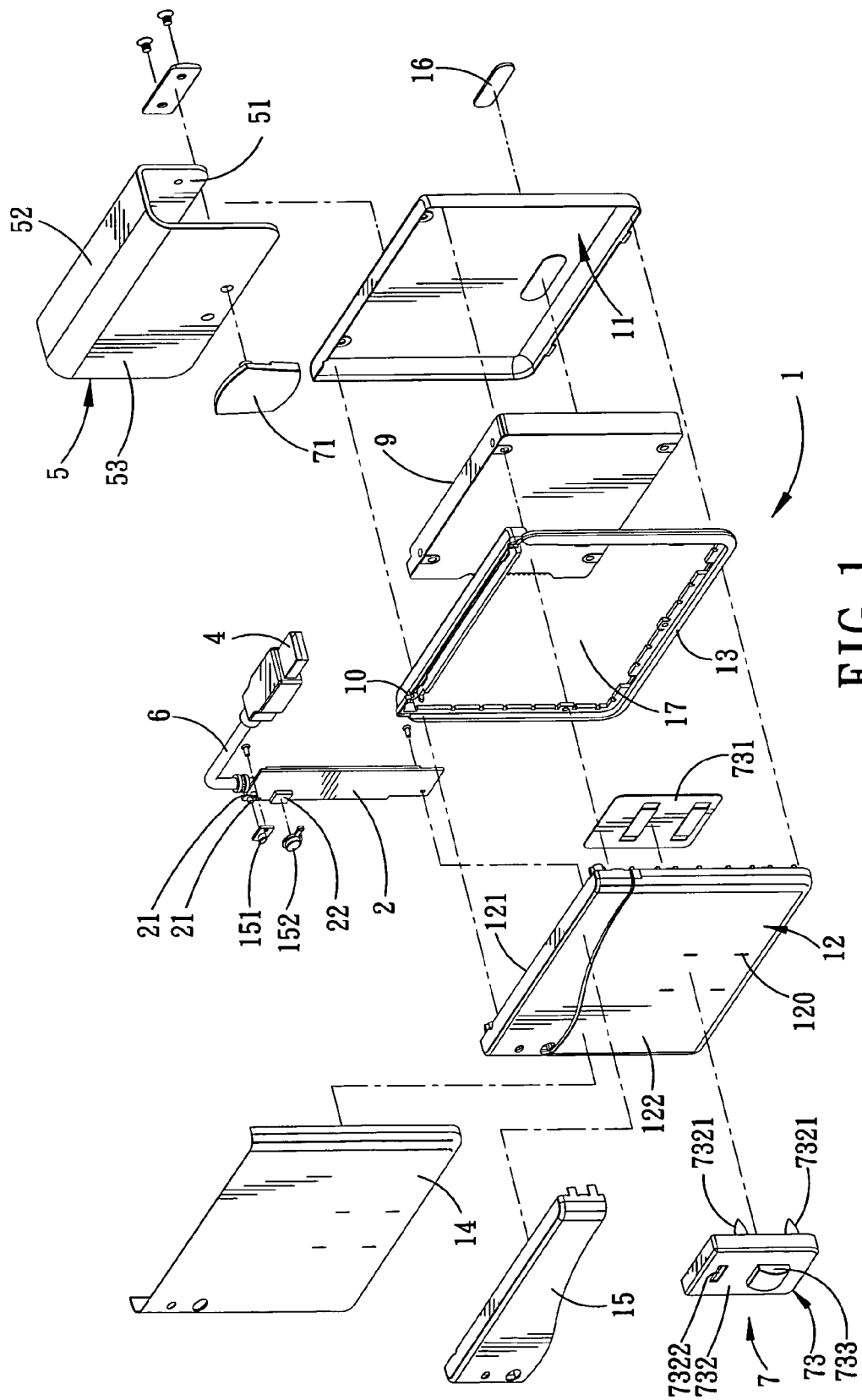
FIG. 1 is an exploded perspective view showing the first preferred embodiment of an external casing for a data storage device according to the present invention.

Before the present invention is described in greater detail, it should be noted that like elements are denoted by the same reference numerals throughout the disclosure.

Figure 3:
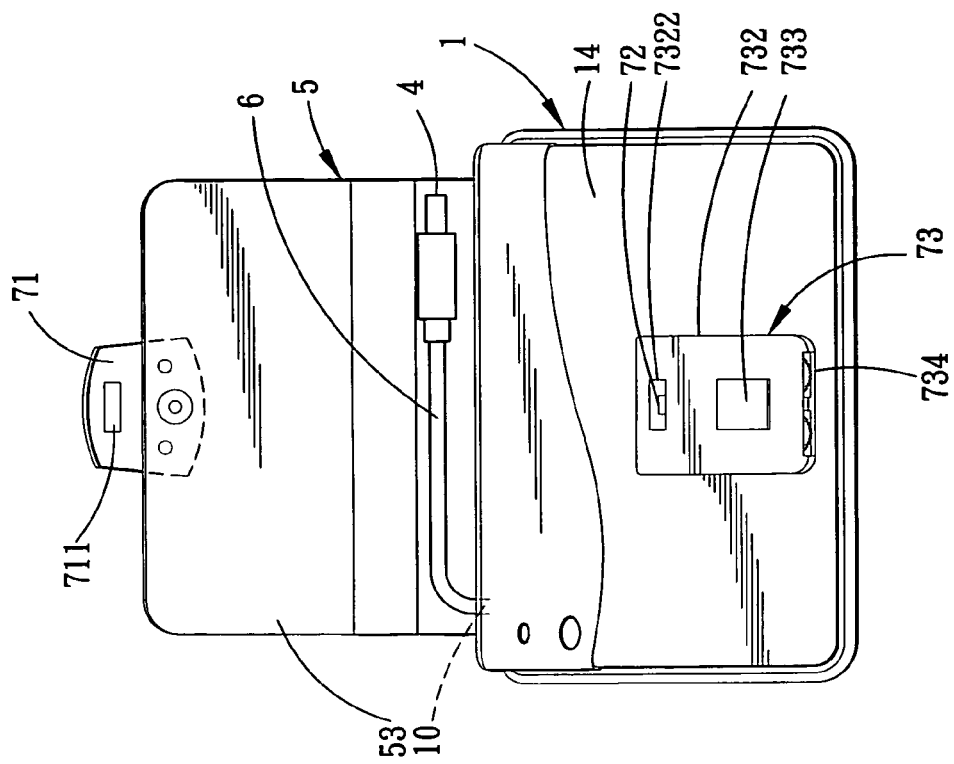
FIG. 3 is a schematic view showing the first preferred embodiment when the latch control unit of the first preferred embodiment is in an unlocking state.
Figure 2:
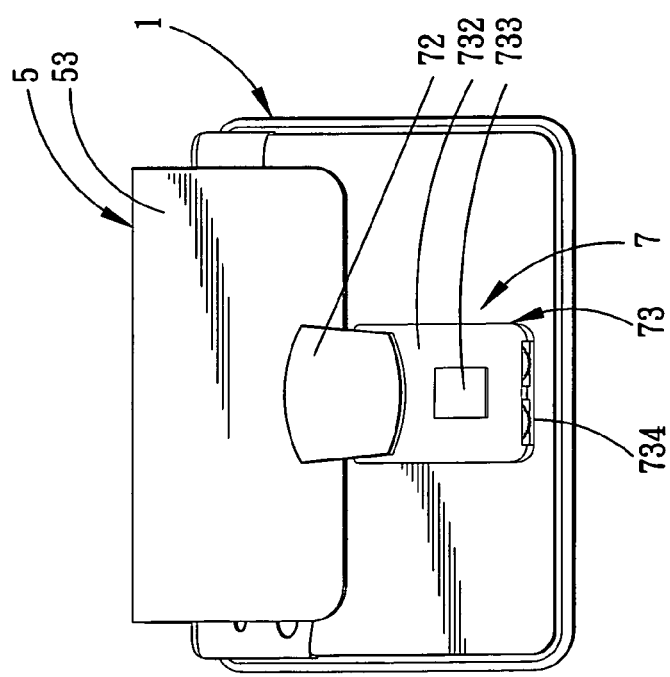
FIG. 2 is a schematic view showing the first preferred embodiment when a latch control unit of the first preferred embodiment is in a locking state.

Referring to FIGS. 1 to 3, the first preferred embodiment of an external casing for a data storage device 9, such as a hard disk, according to the present invention is shown to include a housing 1, an interface module 2, an external electrical connector 4, a foldable cover member 5, and a lock unit 7.

In this embodiment, the housing 1 has opposite first and second housing parts 11, 12, a looped metal frame 13, a leather skin layer 14, and a cover plate 15. The looped metal frame 13 is disposed between and interconnects the first and second housing parts 11, 12 so as to define an accommodating space 17 thereamong. The accommodating space 17 is adapted for receiving the data storage device 9 therein. The housing 1 is formed with an opening 10 for access into the accommodating space 17. The second housing part 12 has opposite outer and inner surfaces 121, 122, and is formed with a plurality of through holes 120 that extend from the outer surface 122 to the inner surface 121. The leather skin layer 14 is superposed on and is attached fixedly to the outer surface 122 of the second housing part 12. The cover plate 15 is superimposed on and is attached fixedly to a portion of the leather skin layer 14, and is disposed adjacent to the opening 10. The cover plate 15 is provided with a user-operable button 152 that extends through the second housing part 12 and the leather skin layer 14 and into the accommodating space 17. In this embodiment, an anti-slip pad 16 is provided on the first housing part 11 of the housing 1.

In this embodiment, the first housing part 11 and the cover plate 15 are made of metal materials, while the second housing part 12 is made of a plastic material.

The interface module 2 is disposed in the accommodating space 17, and is adapted to be connected electrically to the data storage device 9 that is disposed in the accommodating space 17 in the housing 1. In this embodiment, the interface module 2 includes a switch 22 that is coupled to and actuated through the user-operable button 152 for data access control. The interface module 2 further includes two status indicators 21, such as light emitting diodes, for providing visual indication of data access status of the data storage device 9 that is visible through the second housing part 12, the leather skin layer 14 and the cover plate 15. The cover plate 15 is provided with a light guide 151 for the status indicators 21.

The external electrical connector 4, such as a Universal Serial Bus (UBS) connector, is connected electrically to the interface module 2, and is disposed in the vicinity of the opening 10 in the housing 1. In this embodiment, a transmission cable 6 extends through the opening 10 in the housing 1 (see FIG. 3), and interconnects the interface module 2 and the external electrical connector 4. It is noted that, in other embodiments of the present invention, the external electrical connector 4 can also be connected electrically and directly to the interface module 2.

The cover member 5, which is made of a flexible material, includes a fixing portion 51 secured to the first housing part 11 of the housing 1, an engaging portion 53 opposite to the fixing portion 51, and an intermediate covering portion 52 interconnecting the fixing portion 51 and the engaging portion 53 and covering over the external electrical connector 4.

The lock unit 7 is provided on the second housing part 12 of the housing 1 and the engaging portion 53 of the cover member 5 for selectively anchoring the engaging portion 53 of the cover member 5 to the second housing part 12 of the housing 1. In this embodiment, the lock unit 7 includes a latch seat 71, a latch member 72 (see FIG. 3), and a latch control unit 73.

The latch seat 71 is mounted fixedly on the engaging portion 53 of the cover member 5. In this embodiment, the latch seat 71 has an engaging ring 711 (see FIG. 3).

The latch member 72 is mounted movably on the second housing part 12 of the housing 1, and engages separably the engaging ring 711 of the latch seat 71 so as to anchor removably the engaging portion 53 of the cover member 5 to the second housing part 12 of the housing 1.

The latch control unit 73 is coupled to the latch member 72, and is operable so as to switch from a locking state, where the latch member 72 is fixed relative to the second housing part 12 of the housing 1, to an unlocking state, where the latch member 72 is movable relative to the second housing part 12 of the housing 1, in response to an input that is associated with a set of preset codes such that the latch member 72 is separable from the engaging ring 711 of the latch seat 71 when the latch control unit 73 is in the unlocking state, thereby allowing removal of the engaging portion 53 of the cover member 5 from the second housing part 12 of the housing 1. In this embodiment, the latch control unit 73 includes a mounting plate 731, a base 732, an actuator member 733, and a code input module 734. The mounting plate 731 is disposed on the inner surface 121 of the second housing part 12 of the housing 1. The base 732 is disposed on the outer surface 122 of the second housing part 12 of the housing 1, and has a plurality of integral connecting bars 7321 that extend respectively through the leather skin layer 14 and the through holes 120 in the second housing part 12 of the housing 1 and that are connected fixedly to the mounting plate 731, thereby securing the base 732 and the mounting plate 731 to the second housing part 12 of the housing 1. The base 732 is formed with an insertion hole 7322 that permits extension of the engaging ring 711 of the latch seat 71 thereinto. The actuator member 733 is disposed movably on the base 732, and is connected fixedly to the latch member 72. The actuator member 733 is operable so as to move the latch member 72 toward and away from the engaging ring 711 of the latch seat 71 when the engaging ring 711 of the latch seat 71 is extended into the insertion hole 7322 in the base 732. The code input module 734 is configured as two rotatable wheels, is mounted on the base 732 (see FIGS. 2 and 3), and is operable so as to generate the input that is associated with the set of the preset codes. As such, the latch member 72 is movable in the base 732 in the vicinity of the insertion hole 7322 when the latch control unit 73 is in the unlocking state. On the other hand, when the latch control unit 73 is in the locking state, the latch member 72 engages the engaging ring 711 of the latch seat 71 and cannot move in the base 732 so as to prevent removal of the engaging ring 711 of the latch seat 71 from the insertion hole 7322 in the base 732, thereby ensuring security of data stored in the data storage device 9.

Figure 4:
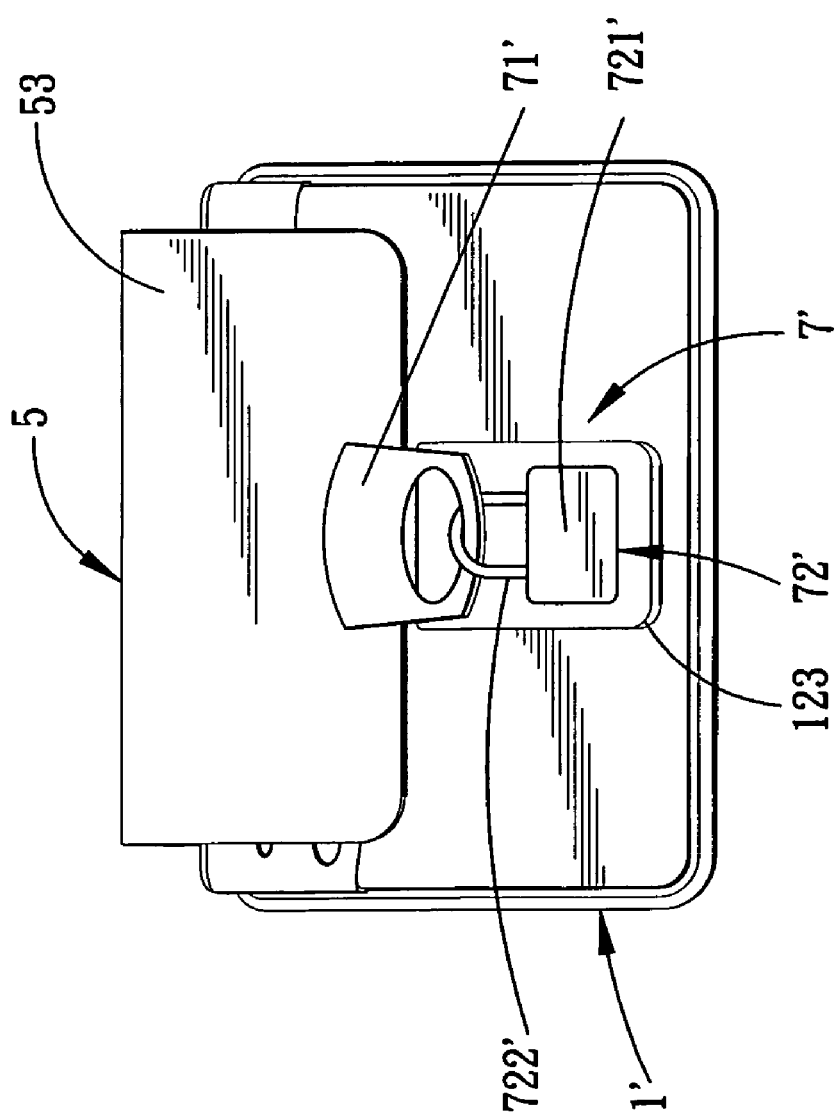
FIG. 4 is a schematic view showing the second preferred embodiment of an external casing according to the present invention.

FIG. 4 illustrates the second preferred embodiment of an external casing for a data storage device according to this invention, which is a modification of the first preferred embodiment. Unlike the previous embodiment, the lock unit 7' includes an engaging ring 71' and a lock member 72'.

The engaging ring 71' is fastened to the engaging portion 53 of the cover member 5.

The lock member 72' includes a lock body 721' fixed on a mounting seat 123 of the second housing part of the housing 1', and a shackle 722' that is movable relative to the lock body 721' between a locking position and an unlocking position. The shackle 722' of the lock member 72' engages the engaging ring 71' when in the locking position, thereby preventing removal of the engaging portion 53 of the cover member 5 from the second housing part of the housing 1'. On the other hand, the shackle 722' of the lock member 72' is removed from the engaging ring 71' when in the unlocking position, thereby permitting removal of the engaging portion 53 of the cover member 5 from the second housing part of the housing 1'.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An external casing for a data storage device, comprising:
    a housing configured with an accommodating space adapted for receiving the data storage device therein and formed with an opening for access into said accommodating space, said housing having opposite first and second housing parts;
    an interface module disposed in said accommodating space and adapted to be connected electrically to the data storage device that is disposed in said accommodating space in said housing;
    an external electrical connector connected electrically to said interface module and disposed in the vicinity of said opening in said housing;
    a foldable cover member including a fixing portion secured to said first housing part of said housing, an engaging portion opposite to said fixing portion, and an intermediate covering portion interconnecting said fixing portion and said engaging portion and covering over said external electrical connector; and
    a lock unit provided on said second housing part of said housing and said engaging portion of said cover member for selectively anchoring said engaging portion of said cover member to said second housing part of said housing.

2. The external casing as claimed in claim 1, wherein said lock unit includes:

a latch seat mounted fixedly on one of said second housing part of said housing and said engaging portion of said cover member;

a latch member mounted movably on the other one of said second housing part of said housing and said engaging portion of said cover member and engaging separably said latch seat so as to anchor removably said engaging portion of said cover member to said second housing part of said housing; and a latch control unit coupled to said latch member and operable so as to switch from a locking state, where said latch member is fixed relative to the corresponding one of said second housing part of said housing and said engaging portion of said cover member, to an unlocking state, where said latch member is movable relative to the corresponding one of said second housing part of said housing and said engaging portion of said cover member, in response to an input that is associated with a set of preset codes such that said latch member is separable from said latch seat when said latch control unit is in the unlocking state, thereby allowing removal of said engaging portion of said cover member from said second housing part of said housing.

3. The external casing as claimed in claim 2, wherein:

said second housing part of said housing has opposite outer and inner surfaces, and is formed with a plurality of through holes that extend from said outer surface to said inner surface;

said latch control unit of said lock unit includes a mounting plate disposed on said inner surface of said second housing part of said housing, a base disposed on said outer surface of said second housing part of said housing and having a plurality of integral connecting bars that extend respectively through said through holes in said second housing part of said housing and that are connected fixedly to said mounting plate, and an actuator member disposed movably on said base and connected fixedly to said latch member, said actuator member being operable so as to move said latch member toward and away from said latch seat; and said latch seat of said lock unit is mounted fixedly on said engaging portion of said cover member.

4. The external casing as claimed in claim 3, wherein:

said base of said latch control unit is formed with an insertion hole, said latch control unit of said lock unit further having a code input module mounted on said base and operable so as to generate the input that is associated with the set of preset codes, said latch member being movable in said base in the vicinity of said insertion hole when said latch control unit is in the unlocking state; and said latch seat of said lock unit has an engaging ring extending into said insertion hole in said base and engaging said latch member so as to prevent removal of said engaging ring of said latch seat from said insertion hole in said base when said latch control unit is in the locking state.

5. The external casing as claimed in claim 1, further comprising a transmission cable interconnecting said interface module and said external electrical connector.

6. The external casing as claimed in claim 1, wherein said cover member is made of a flexible material.

7. The external casing as claimed in claim 1, wherein said first housing part cooperates with said second housing part to define said accommodating space therebetween.

8. The external casing as claimed in claim 7, wherein said housing further has a looped metal frame that is disposed between and that interconnects said first and second housing parts so as to define said accommodating space thereamong.

9. The external casing as claimed in claim 1, wherein said housing includes a leather skin layer superposed on and attached fixedly to an outer surface of said second housing part.

10. The external casing as claimed in claim 9, wherein said housing further includes a cover plate superimposed on and attached fixedly to a portion of said leather skin layer and disposed adjacent to said opening.

11. The external casing as claimed in claim 10, wherein said cover plate is made of a metal material.

12. The external casing as claimed in claim 10, wherein said cover plate is provided with a user-operable button that extends through said second housing part and said leather skin layer and into said accommodating space, said interface module including a switch that is coupled to and actuated through said user-operable button for data access control.

13. The external casing as claimed in claim 12, wherein:

said interface module further includes at least one status indicator for providing visual indication of data access state of the data storage device that is visible through said second housing part, said leather skin layer and said cover plate; and said cover plate is provided with a light guide for said status indicator.

14. The external casing as claimed in claim 1, wherein said first housing part of said housing is made of a metal material.

15. The external casing as claimed in claim 1, further comprising an anti-slip pad provided on said first housing part of said housing.

16. The external casing as claimed in claim 1, wherein said second housing part of said housing is made of a plastic material.

17. The external casing as claimed in claim 1, wherein said lock unit includes:

an engaging ring fastened to said engaging portion of said cover member; and a lock member including a lock body fixed on said second housing part of said housing, and a shackle that is movable relative to said lock body between a locking position and an unlocking position, said shackle of said lock member engaging said engaging ring when in the locking position, said shackle of said lock member being removed from said engaging ring when in the unlocking position.

* * * * *